(12) United States Patent
Hogan et al.

(10) Patent No.: US 12,515,352 B2
(45) Date of Patent: Jan. 6, 2026

(54) VISUOTACTILE OPERATORS FOR PROXIMITY SENSING AND CONTACT CONTROL

(71) Applicant: SAMSUNG ELECTRONICS CO., LTD., Suwon-si (KR)

(72) Inventors: Francois Hogan, St-Jean-sur-Rechelieu (CA); Jean-Francois Tremblay, Montreal (CA); Bobak Hamed Baghi, La Prairie (CA); Michael Jenkin, Toronto (CA); Kaleem Siddiqi, Montreal (CA); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 18/103,825

(22) Filed: Jan. 31, 2023

(65) Prior Publication Data

US 2023/0264367 A1    Aug. 24, 2023

Related U.S. Application Data

(60) Provisional application No. 63/313,711, filed on Feb. 24, 2022.

(51) Int. Cl.
*B25J 13/08*    (2006.01)
*B25J 19/02*    (2006.01)

(52) U.S. Cl.
CPC ........... *B25J 13/084* (2013.01); *B25J 19/023* (2013.01)

(58) Field of Classification Search
CPC ...... B25J 13/084; B25J 19/023; B25J 9/1612; B25J 13/083; B25J 9/1697; G05B 2219/39507; G05B 2219/40567; G05B 2219/40575; G05B 2219/40625
See application file for complete search history.

(56) References Cited

U.S. PATENT DOCUMENTS

2020/0306980 A1* 10/2020 Choi ...................... B25J 9/1697

OTHER PUBLICATIONS

Hogan, Francois Robert, et al. "Seeing Through your Skin: Recognizing Objects with a Novel Visuotactile Sensor." arXiv e-prints ( 2020): arXiv-2011. (Year: 2020).*
A. Yamaguchi and C. G. Atkeson, "Implementing tactile behaviors using FingerVision," 2017 IEEE-RAS 17th International Conference on Humanoid Robotics (Humanoids), Birmingham, UK, 2017, pp. 241-248 (Year: 2017).*
Dong, Siyuan, Wenzhen Yuan, and Edward H. Adelson. "Improved gelsight tactile sensor for measuring geometry and slip." 2017 IEEE/RSJ International Conference on Intelligent Robots and Systems (IROS). IEEE, 2017 (Year: 2017).*
(Continued)

*Primary Examiner* — Adam R Mott
*Assistant Examiner* — Matthew C Gammon
(74) *Attorney, Agent, or Firm* — Sughrue Mion, PLLC

(57) ABSTRACT

A method for identifying and manipulating objects may include obtaining, from an image sensor, image sensor data; identifying, using the image sensor data, a location of an object; controlling a robotic element, which includes the image sensor, to move towards the location of the object; determining a slippage based on contact between the image sensor and the object; and controlling a movement of the robotic element based on the determined slippage.

15 Claims, 14 Drawing Sheets

(56) References Cited

OTHER PUBLICATIONS

Zhang, Yazhan, et al. "Fingervision tactile sensor design and slip detection using convolutional lstm network." arXiv preprint arXiv: 1810.02653 (2018) (Year: 2018).*

Hogan, Francois Robert, et al. "Seeing Through your Skin: Recognizing Objects with a Novel Visuotactile Sensor." arXiv e-prints ( 2020): arXiv-2011 (Year: 2011).*

Yamaguchi, Akihiko, and Christopher G. Atkeson. "Combining finger vision and optical tactile sensing: Reducing and handling errors while cutting vegetables." 2016 IEEE-RAS 16th International Conference on Humanoid Robots (Humanoids). IEEE, 2016 ( Year: 2016).*

Dong, Siyuan, et al. "Maintaining grasps within slipping bounds by monitoring incipient slip." 2019 International Conference on Robotics and Automation (ICRA). IEEE, 2019 (Year: 2019).*

James, Jasper Wollaston, and Nathan F. Lepora. "Slip detection for grasp stabilization with a multifingered tactile robot hand." IEEE Transactions on Robotics 37.2 (2020): 506-519 (Year: 2020).*

Yuan, Wenzhen, et al. "Measurement of shear and slip with a GelSight tactile sensor." 2015 IEEE International Conference on Robotics and Automation (ICRA). IEEE, 2015 (Year: 2015).*

Kehl, Wadim, et al. "Ssd-6d: Making rgb-based 3d detection and 6d pose estimation great again." Proceedings of the IEEE international conference on computer vision. 2017 (Year: 2017).*

Hogan, Francois R., et al. "Tactile dexterity: Manipulation primitives with tactile feedback." 2020 IEEE international conference on robotics and automation (ICRA). IEEE, 2020 (Year: 2020).*

Yamaguchi, Akihiko. "FingerVision with whiskers: Light touch detection with vision-based tactile sensors." 2021 Fifth IEEE International Conference on Robotic Computing (IRC). IEEE, 2021 (Year: 2021).*

* cited by examiner

VISUOTACTILE OPERATORS FOR PROXIMITY SENSING AND CONTACT CONTROL

CROSS-REFERENCE TO RELATED APPLICATION(S)

This application is based on and claims priority under 35 U.S.C. § 119 to U.S. Provisional Patent Application No. 63/313,711 filed on Feb. 24, 2022, in the U.S. Patent & Trademark Office, the disclosure of which is incorporated herein by reference in its entirety.

BACKGROUND

1. Field

The disclosure relates to tactile and visual sensors, and more particularly to a semitransparent tactile sensor capable of tactile and visual sensing, and a method of sensing an interaction with an object using the semitransparent sensor.

2. Description of Related Art

Related robotic grasping methods struggle to combine visual and tactile feedback to reliably retrieve objects. Robots may be useful in homes and factories by grasping objects. Current grasping solutions use visual-only feedback and do not integrate tactile sensing effectively. Despite recent advances in tactile sensor technologies and complex robotic hands, robotic manipulation systems largely operate with open-loop visual sensing and do not effectively process tactile sensory information. This results in an inability of robotic systems to react to errors and grasp unknown objects.

While there are some available tactile sensing technologies, the feedback from such sensors has previously been difficult to be integrated by robotic sensors. Recently, there have been optical tactile sensors that return image-based measurements that contain information but from which it may be difficult to extract meaningful signals.

Related optical tactile sensing technologies do not allow a sensor to visualize the world beyond the tactile membrane. A recent family of tactile sensors called See-Through-your-Skin sensors (STS) allow for controlling a transparency of a reflective membrane and to visualize information beyond the sensor. This offers a sensing capability allowing robots to detect a relative position of object relative to the robot hand while being occlusion free. One difficulty may be that an output of the STS sensor is an RGB image and may be difficult to interpret.

Further, object slippage detection methods in the related art do not estimate a magnitude and direction of slip, but return a binary slip value.

SUMMARY

According to an aspect of the present disclosure, visual and tactile signals may be extracted that are accurate and useful for robotic grasp control, thus enabling robots to sense a location of objects prior to contact and detect object slippage.

According to an aspect of the present disclosure, a method for identifying and manipulating objects, the method includes: obtaining, from an image sensor, image sensor data; identifying, using the image sensor data, a location of an object; controlling a robotic element, which includes the image sensor, to move towards the location of the object; determining a slippage based on contact between the image sensor and the object; and controlling a movement of the robotic element based on the determined slippage.

The identifying the location of the object may include identifying a bounding box for the object in an image that is represented by the image sensor data.

The identifying the bounding box may include predicting coordinates of the bounding box in the image.

The identifying the bounding box may include identifying a centroid of the bounding box and determining a distance between the centroid and a center of the image sensor.

The determining the slippage may include measuring a deformation of a surface of the image sensor when the image sensor is in contact with the object.

The determining the slippage may include determining a marker flow and determining an object flow, and determining a slip field as a difference between the object flow and the marker flow.

The determining the marker flow may include identifying movement of at least one marker, and wherein determining the object flow may include determining a motion of the object in relation to the image sensor.

The method may further include combining the marker flow and the object flow using a convolutional neural network architecture.

According to another aspect of the present disclosure, an electronic device for performing image authentication includes: at least memory storing instructions; and at least one processor configured to execute the instructions to: obtain, from an image sensor, image sensor data; identify, using the image sensor data, a location of an object; control a robotic element, which includes the image sensor, to move towards the location of the object; determine a slippage based on contact between the image sensor and the object; and control a movement of the robotic element based on the determined slippage.

The at least one processor may be further configured to identify a bounding box for the object in an image that is represented by the image sensor data.

The at least one processor is further configured to predict coordinates of the bounding box in the image.

The at least one processor is further configured to identify a centroid of the bounding box and determine a distance between the centroid and a center of the image sensor.

The at least one processor is further configured to measure a deformation of a surface of the image sensor when the image sensor is in contact with the object.

The at least one processor is further configured to determine a marker flow and determine an object flow, and determine a slip field as a difference between the object flow and the marker flow.

The at least one processor is further configured to identify movement of at least one marker, and wherein determining the object flow may include determining a motion of the object in relation to the image sensor.

The at least one processor is further configured to combine the marker flow and the object flow using a convolutional neural network architecture.

According to another aspect of the present disclosure, a non-transitory computer readable storage medium that stores instructions to be executed by at least one processor to perform a method for identifying and manipulating objects includes: obtaining, from an image sensor, image sensor data; identifying, using the image sensor data, a location of an object; controlling a robotic element, which includes the image sensor, to move towards the location of the object; determining a slippage based on contact between the image sensor and the object; and controlling a movement of the robotic element based on the determined slippage.

The identifying the location of the object may include identifying a bounding box for the object in an image that is represented by the image sensor data.

The identifying the bounding box may include predicting coordinates of the bounding box in the image.

The identifying the bounding box may include identifying a centroid of the bounding box and determining a distance between the centroid and a center of the image sensor.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
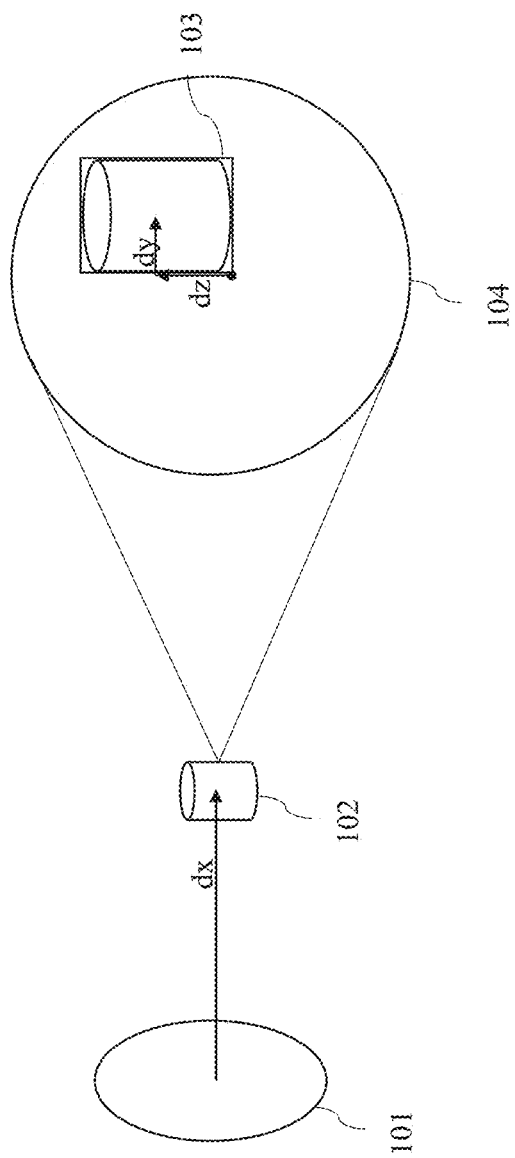
FIG. 1 is a diagram illustrating a visuotactile sensor, according to an embodiment.

The following detailed description of example embodiments refers to the accompanying drawings. The same reference numbers in different drawings may identify the same or similar elements.

The disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

According to one or more embodiments, computer vision algorithms may enable robots using optical tactile sensors to better sense and react to interactions with an object in their environment. Algorithms provide a unified solution that may use a single sensor to detect the location and identify of an object as a robot hand approaches the object and to characterize the contact state (stick/slip) once the robot makes contact with the object. Embodiments are not limited to this.

According to one or more embodiments, a computer vision-based algorithm estimates the distance and relative position of the object relative to the sensor, allowing a robot to reliably approach objects prior to contact.

According to one or more embodiments, a slip detection algorithm may estimate dense pixel-wise values to identify a direction and magnitude of object slippage. These algorithms may be applied to optical tactile sensor technologies resulting in new robot grasping capabilities and more reliable robotic behavior. These may allow for robots to be deployed and to be effective in real-world applications such as home and service robotics.

Manipulating an object effectively may require both proximity and contact sensing. The disclosure presents visuotactile operators for proximity sensing and contact control, and algorithms that use the measurements from high-resolution optical tactile sensors. This enables a robot to sense an object prior to, during, and after contact has occurred. The disclosure describes algorithmic solutions that use a visuotactile sensor to estimate several object properties essential to robotic manipulation, including distance to contact and object slip. These algorithms enable a robot to approach an object with precision up to the moment of contact. During contact, the algorithm senses object slippage by detecting how tactile cues move relative to the sensor's contact surface. This capability provides robots with feedback to accomplish improved robotic dexterity, such as grasping of household objects, assembling of complex parts (e.g., electronics), and natural interaction with humans.

FIG. 1 is a diagram illustrating an operation of a visuotactile sensor, according to an embodiment. A feature of the visuotactile sensor 101 is to obtain an identity and a position of an object relative to the sensor. An object detection neural network architecture may be trained to recognize and localize the target in the visual field of the STS sensor. This may be built on object detection networks (e.g., YoloV5), and weights may be fine-tuned on a limited number of hand labelled images. Object detection may be used to infer two or more object properties.

Image 104 is an enlarged view of the image returned by sensor 101. A bounding box 103 may be identified to determine the properties of object 102 (e.g., soda can). According to an embodiment, an object's bounding box 103 may allow for a determination of its centroid and relative position to the center of the sensor (e.g., dy, dz). An area of the bounding box may be used to infer the proximity of the object relative to the sensor (e.g., dx). Given an area of the object in pixels using object detection, a model may be used to estimate the distance to contact dx using the linear relation $A = k\,(dx)^2$, where A is the current measured area of the object in pixels. A model may be trained by collecting a dataset of $(dx_i; A_i)$ pairs, obtained by running robot trajectories where the robot gripper approaches the target object. Thus, according to an embodiment, a method may predict the object location (x,y,z) in a three-dimension (3D) relative to the sensor using optical tactile sensors. As illustrated in FIG. 1, the visual modality is used to capture the position (e.g., dx, dy, dz) of the object relative to the camera by segmenting the target object with a bounding box.

Figure 2A:
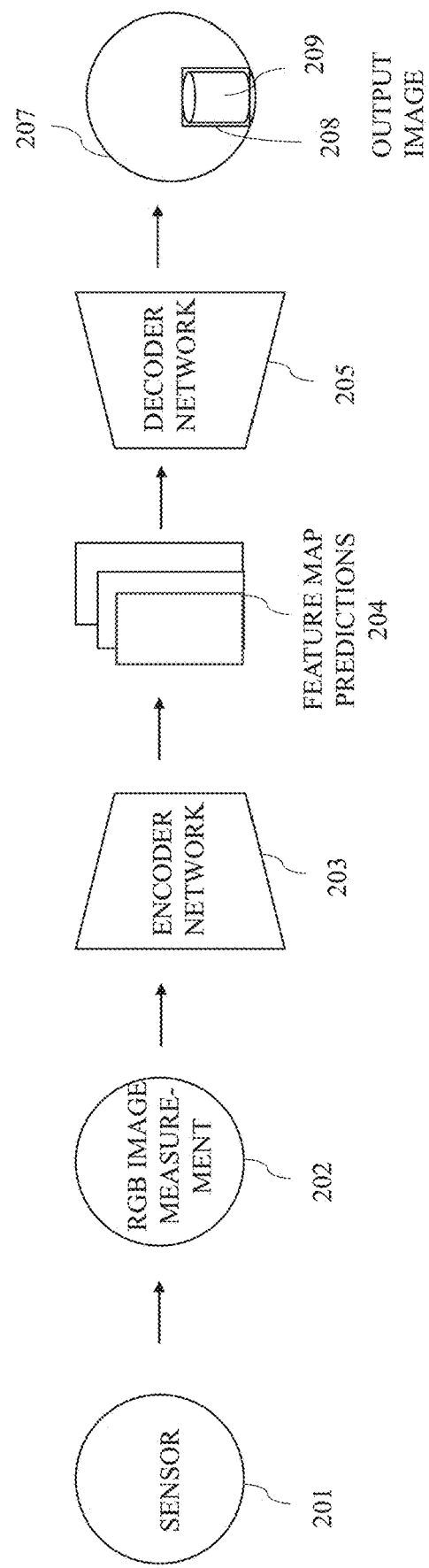
FIG. 2A is a diagram illustrating object detection and localization, according to an embodiment.

FIG. 2A is a diagram illustrating object detection and localization, according to an embodiment. As illustrated in FIG. 2A, a visuotactile sensor 201 provides an RGB image measurement 202, and using encoder network 203, feature map predictions 204, and decoder network 205. Using an encoder-decoder object detection neural network, the network may be trained to return an output image 207 and predict a bounding box 208 and identify the manipulated object 209.

Figure 2B:
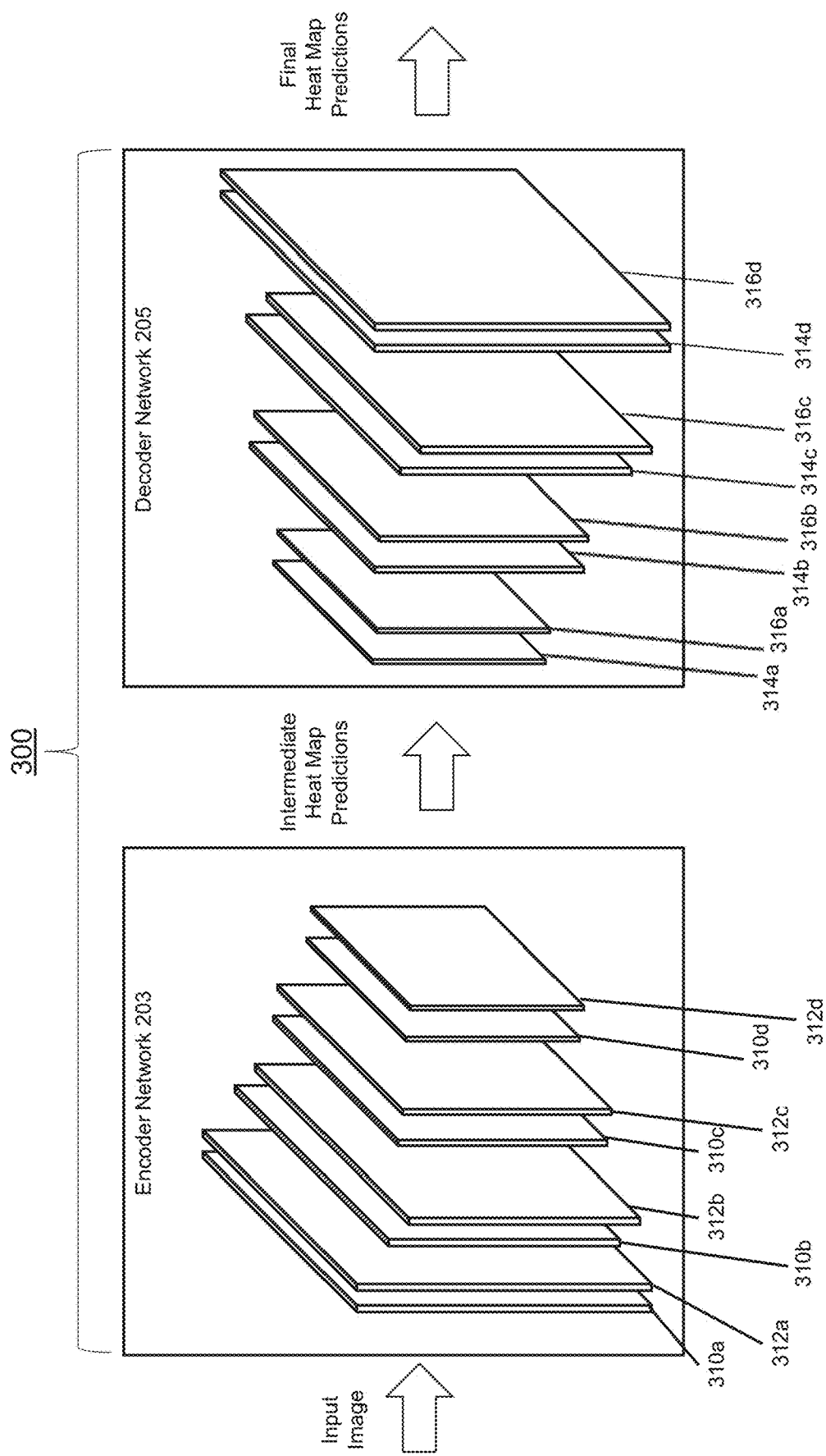
FIG. 2B is a diagram illustrating a structure of an encoder network and a decoder network according to an embodiment.
Figure 3:
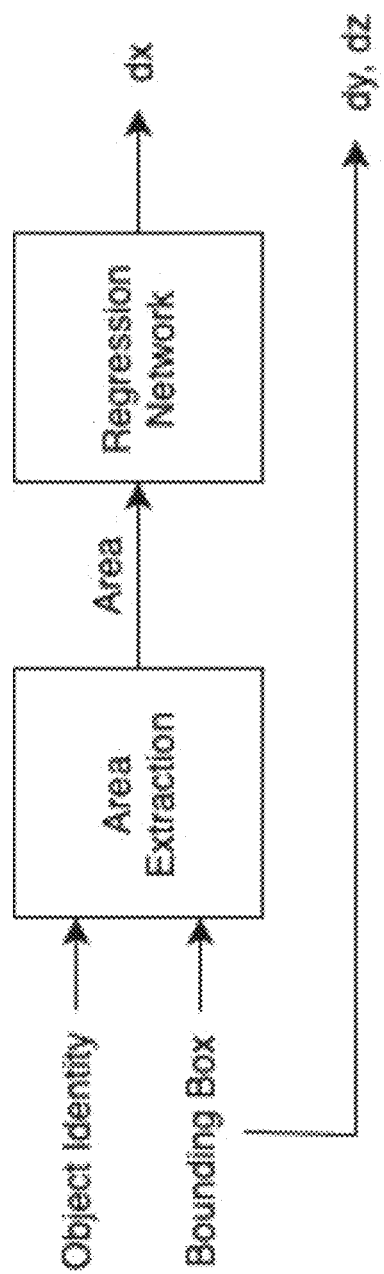
FIG. 3 is a block diagram illustrating a method of proximity sensing, according to an embodiment.

FIG. 2B illustrates an example convolutional neural network architecture 300 of the encoder network 203 and the decoder network 205. In particular, the convolutional neural network architecture 300 shown in FIG. 3 represents one possible implementation of the convolutional neural network used in the object detection and localization shown in FIG. 2A.

As shown in FIG. 2B, the convolutional neural network architecture 300 generally operates to receive an input image (e.g., the RGB image measurement 202 of the input image) and to produce the output image 207 including a bounding box 208 that identifies the detected object 209.

The convolutional neural network architecture 300 may represent a type of deep artificial neural networks, which are often applied to analyze images. In this example, the convolutional neural network architecture 300 is formed using an encoder network 203 and a corresponding decoder network 205. The encoder network 203 is formed using multiple encoder layers, which include multiple convolutional layers 310a-310d and multiple pooling layers 312a-312d. Each of the convolutional layers 310a-310d represents a layer of convolutional neurons, which apply a convolution operation that emulates the response of individual neurons to visual stimuli. Each neuron typically applies some function to its input values (often by weighting different input values differently) to generate output values. Each of the pooling layers 312a-312d represents a layer that combines the output values of neuron clusters from one convolutional layer into input values for the next layer. The encoder network 203 here is shown as including four encoder layers having four convolutional layers 310a-310d and four pooling layers 312a-312d, although the encoder network 203 could include different numbers of encoder layers, convolutional layers, and pooling layers.

In some embodiments, each of the convolutional layers 310a-310d can perform convolution with a filter bank (containing filters or kernels) to produce a set of features maps. These feature maps can be batch normalized, and an element-wise rectified linear unit (ReLU) function can be applied to the normalized feature map values. The ReLU function typically operates to ensure that none of its output values is negative, such as by selecting (for each normalized feature map value) the greater of that value or zero. Following that, each of the pooling layers 312a-312d can perform max-pooling with a window and a stride of two (non-overlapping window), and the resulting output is sub-sampled by a factor of two. Max-pooling can be used to achieve translation invariance over small spatial shifts in the input image patch. Sub-sampling results in a large input image context (spatial window) for each pixel in the feature maps.

The decoder network 205 is formed using multiple decoder layers, which include multiple upsampling layers 314a-314d and multiple convolutional layers 316a-316d. Each of the upsampling layers 314a-314d represents a layer that upsamples input feature maps. Each of the convolutional layers 316a-316d represents a trainable convolutional layer that produces dense feature maps, which can be batch normalized. The decoder network 205 here is shown as including four decoder layers having four upsampling layers 314a-314d and four convolutional layers 316a-316d, although the decoder network 205 could include different numbers of decoder layers, upsampling layers, and convolutional layers. Each encoder layer in the encoder network 203 could have a corresponding decoder layer in the decoder network 205, so there could be an equal number of layers in the encoder network 203 and in the decoder network 205.

A convolutional layer 318 processes the feature maps that are output by the decoder network 205. For example, the convolutional layer 318 could perform convolution operations to produce pixel-level blending map patches for the input image patches 302 independently. This allows, for instance, the convolutional layer 318 to convert the feature maps into the blending map patches 304. The blending map patches 304 are dense per-pixel representations of pixel quality measurements involving information about motion degree and well-exposedness.

In some embodiments, the convolutional neural network architecture 300 operates as follows. The initial layers in the encoder network 203 are responsible for extracting scene contents and spatially down-sizing feature maps associated with the scene contents. This enables the effective aggregation of information over large areas of the input image. The later layers in the encoder network 203 learn to merge the feature maps. The layers of the decoder network 205 simulates coarse-to-fine reconstruction of the downsized representations by gradually upsampling the feature maps and translate the feature maps into blending maps. This allows for a more reliable recovery of the details lost by the encoder network 203.

It should be noted that the convolutional neural network architecture 300 shown in FIG. 2A can be easily tailored for use in different applications. For example, sizes of the input image can be varied and have any suitable values, such as 360 pixels by 480 pixels, 256 pixels by 256 pixels, or 200 pixels by 200 pixels. Also, the kernel sizes within the convolutional layers 310a-310d and 316a-316b can be varied and have any suitable values, such as 7×7, 5×5, or 3×3. Further, the stride used within the convolutional layers 310a-310d and 316a-316b can be varied and have any suitable values, such as one or two. Moreover, the number of layers in the encoder network 203 and in the decoder network 205 can be varied and have any suitable values, such as between four and eight layers each. Any or all of these parameters of the convolutional neural network architecture 300 can be selected to optimally fit an application's requirements on performance and computational cost.

In addition, it may be possible to compress and accelerate the operation of the convolutional neural network architecture 300 for real-time applications in various ways. For example, parameter pruning and parameter sharing can be used to remove redundancy in the parameters. As another example, low-rank factorization can be used to estimate informative parameters in learning-based models. As a third example, convolutional filters' utilization can be transferred or compacted by designing special structural convolutional filters to reduce storage and computation complexity.

Although FIG. 2A illustrates one example of a convolutional neural network architecture 300, various changes may be made to FIG. 2A. For example, there are no fully-connected layers in the convolutional neural network architecture 300, so the convolutional neural network architecture 300 here is only convolutional. Other implementations of convolutional neural network architectures can be used, such as designs modeled on the Unet, SegNet, FlowNet, and FlowNet2 architectures. These architectures support various connections between encoder layers and decoders layers (such as those described below), or the architectures can be improved through the use of dropout operations, regularization terms, or data augmentation to avoid overfitting.

FIG. 3 is a block diagram illustrating a method of proximity sensing, according to an embodiment. A proximity of the object to the sensor (dx) is determined based on an area of a bounding box. The area of the bounding box may be mapped to the distance dx using a regression network (e.g., log linear model) with supervised learning, as illustrated in FIG. 4 and described below.

Figure 4:
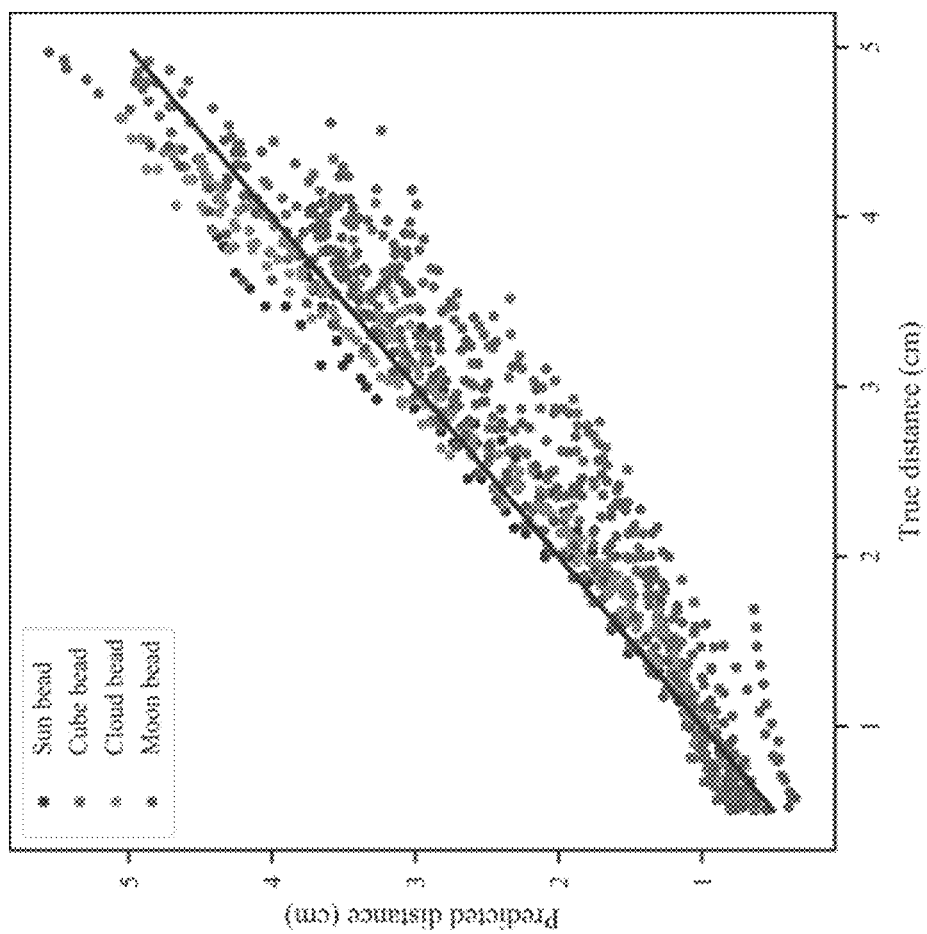
FIG. 4 is a diagram illustrating proximity sensing results, according to an embodiment.

FIG. 4 is a diagram illustrating proximity sensing results, according to an embodiment. As described above, a parameter k may be regressed to fit a relation of A=k(dx)2, where A is the inferred bounding box area and dx is the distance between the sensor and the object. Proximal contact control on a complex Bead Maze robotic manipulation task may be useful. According to an embodiment, a robot may locate and move beads (e.g., sun-shaped bead, cube-shaped bead, cloud-shaped bead, moon-shaped bead) along a curved path by combining proximal sensing and dense slip detection. Visual proximity sensing may be used to locate and control the robot's approach. When an object is grasped, dense slip measurements may be used to control a robot to move in a coordinated manner with the slip vectors. This enables a robot to follow the curved Bead Maze path, without any knowledge about the object or the trajectory's shape.

FIG. 4 illustrates proximal sensing results, in which respective root means square errors may be, e.g., 2.5 mm for the sun-shaped bead, 4.5 mm for the cube-shaped bead, 2.0 mm for the cloud-shaped bead and 4.5 mm for the moon-shaped bead.

Figure 5:
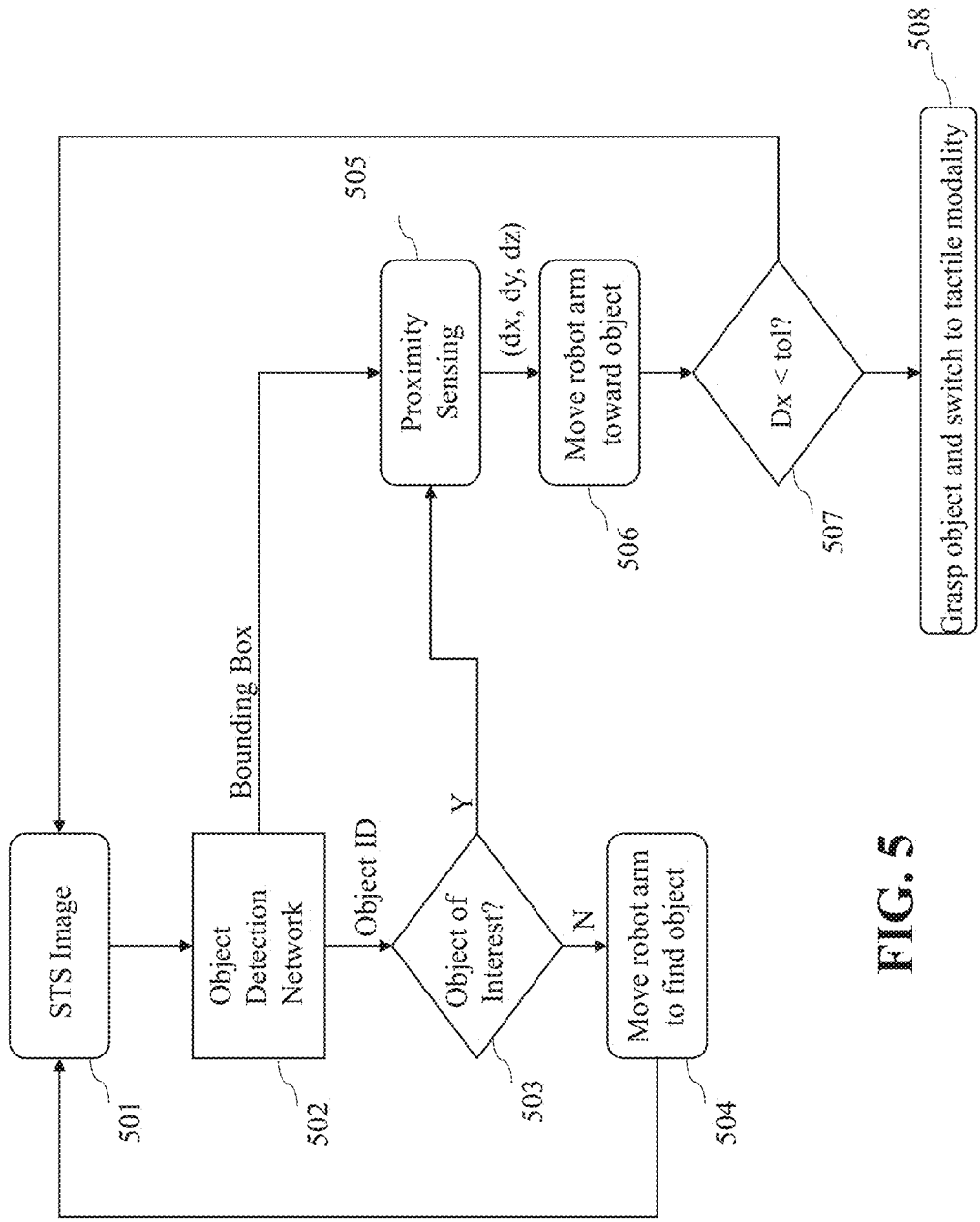
FIG. 5 is a diagram illustrating a method for detecting an object, according to an embodiment.

FIG. 5 illustrates a method for detecting an object, according to an embodiment. As illustrated in FIG. 5, an STS image 501 is provided to an object detection network 502. At operation 503, it is determined whether an object of interest (e.g., targeted object) is identified. If the object targeted to be manipulated is found (503-Y), the bounding box of the object may be used by a proximity sensing algorithm 505 (e.g., FIG. 3) to estimate a location (e.g., dx, dy, dz) relative to the sensor. If the targeted object is not found (503-N), the robot arm may be moved to find an object at operation 504. At operation 506, the robot arm is moved toward the object. At operation 507, it is determined whether the object is within a desired tolerance to the sensor. At operation 508, based on the object being within a desired tolerance, the robot grasps the object and modulates the sensor to switch to tactile sensing.

In tactile sensing mode, the sensor may detect a dense object slippage field when the object is in contact with the sensor. An algorithm may be used that provides dense pixel-wise slip measurements (e.g., pixel displacements) that describe how each section of the object moves relative to contact with the visuotactile sensor. According to an embodiment, a feature of the slip detection algorithm may be to track the object motion relative to the sensor's gel membrane. However, the quantity may not be observable from the raw tactile measurements, as the membrane's elastic deformation may not be known and may not be determinable if the object motion in the image occurs together with the membrane (e.g., sticking); and/or independently from the membrane (e.g., slippage). To detect object slippage, the motion of the membrane (e.g., marker motion) may be compared with the motion of a moving object behind the sensor (e.g., object motion) to characterize the nature of contact. When the object sticks to the sensor, the marker and object motions are consistent, whereas in situations of slip the two motions are different. An additional advantage of this method is that the difference between the object motion and the marker motion renders a dense pixel-wise description of the slip field, that can be used as a rich feedback signal for tactile manipulation policies.

Figure 6A:
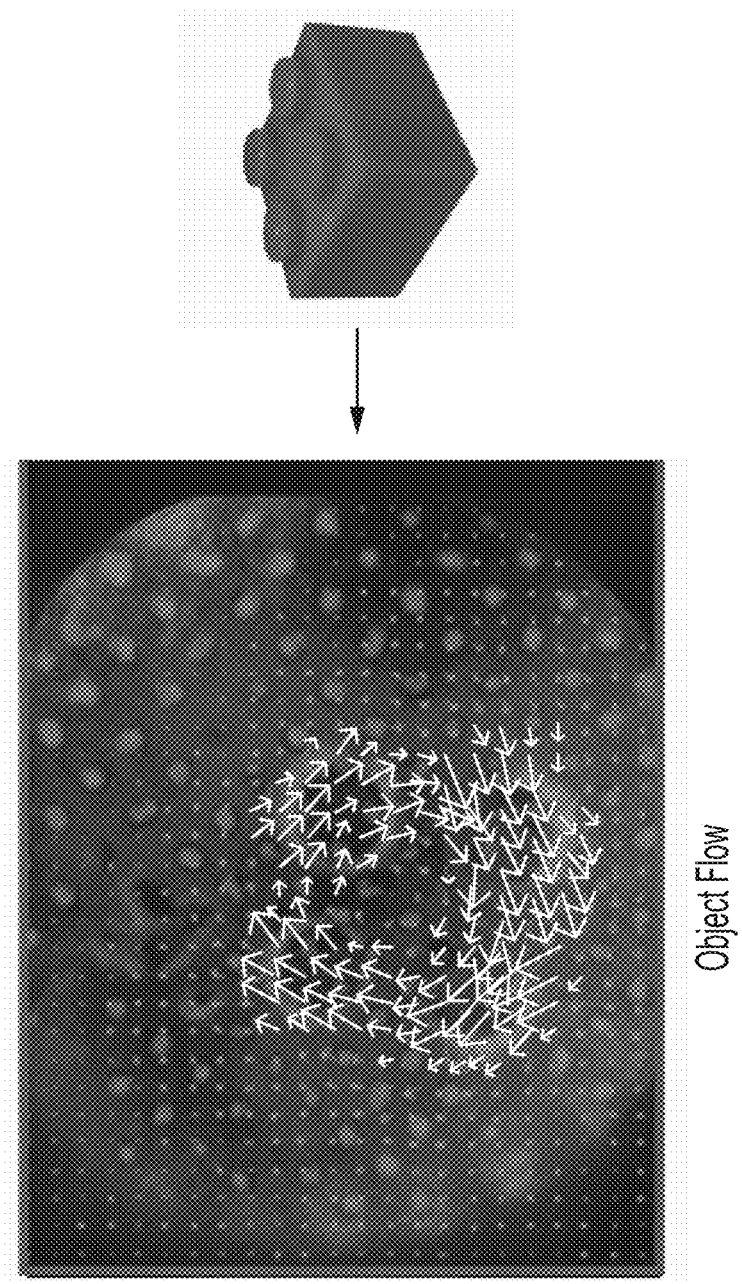
FIGS. 6A, 6B, and 6C illustrate examples of detecting slip, according to one or more embodiments.
Figure 6B:
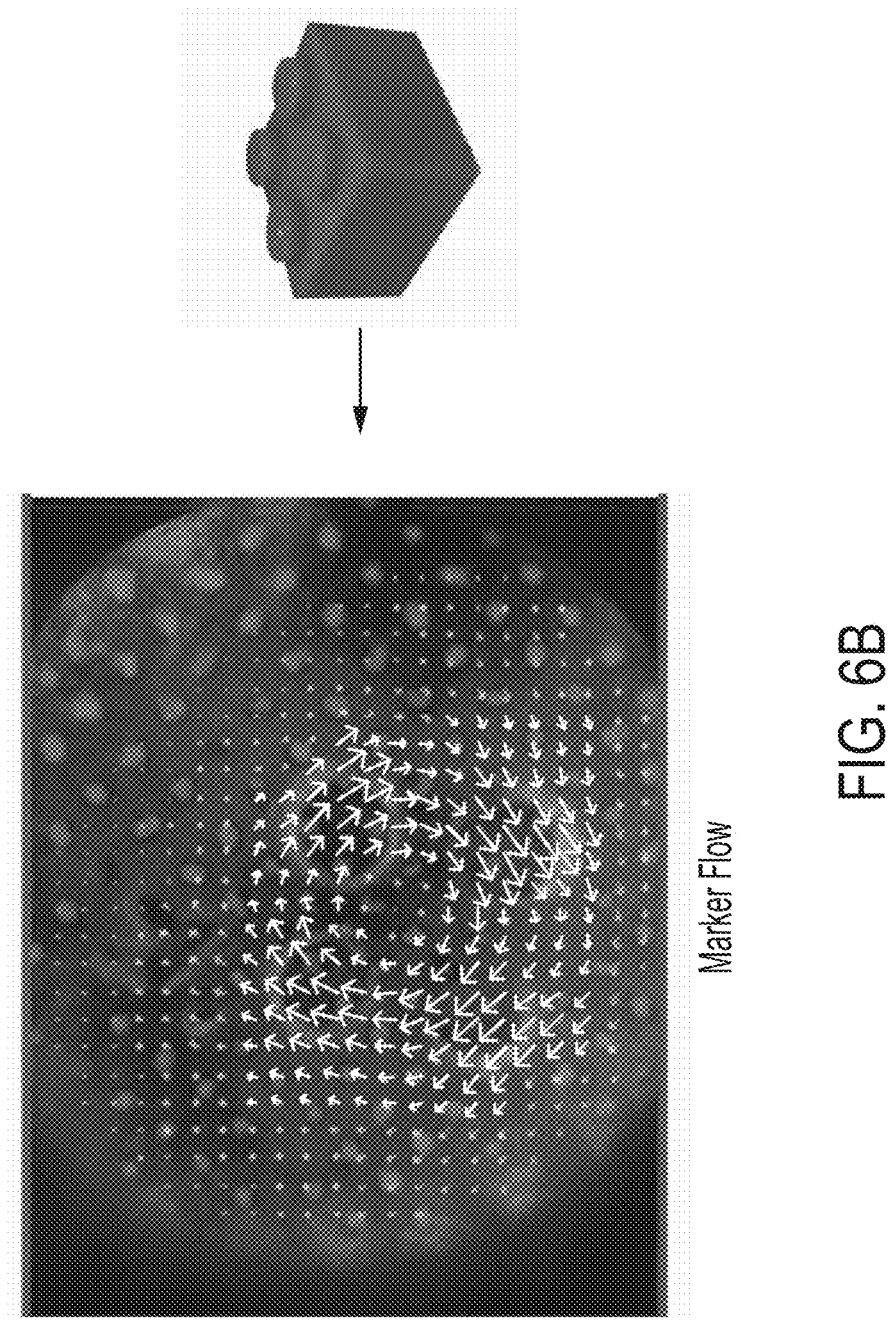
Figure 6C:
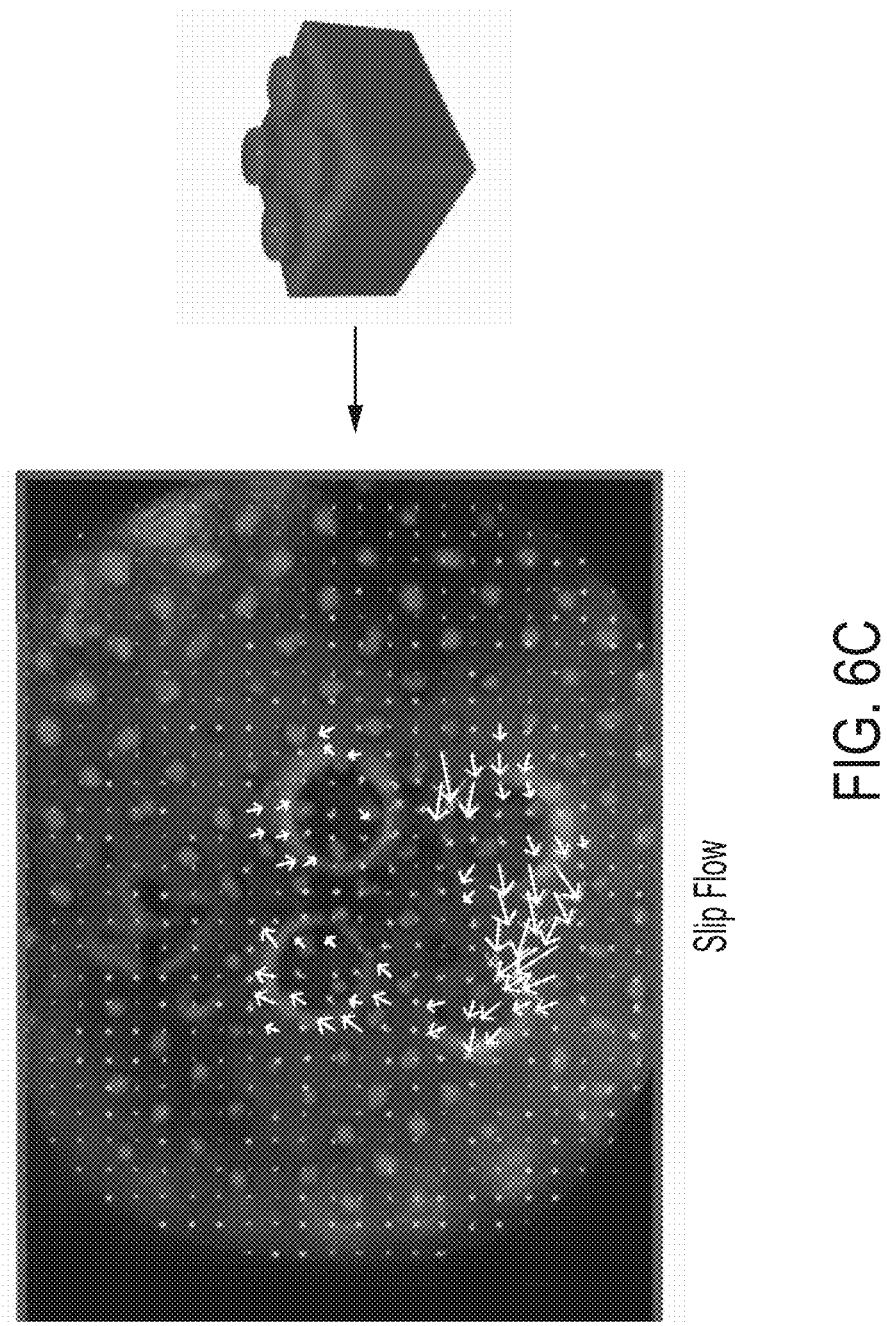

FIGS. 6A, 6B, and 6C illustrate examples of detecting slip, according to one or more embodiments. Object slippage may be quantified by comparing an object's motion (e.g., object flow) with the sensor's gel motion (e.g., marker flow). Object flow may be used to quantify the motion of the object relative to the sensor's camera. Marker flow captures the motion of the gel membrane relative to the camera. The slip flow may identify how the object moves relative to the sensor membrane, and may be computed by pixel-wise subtraction of the marker flow field from the object flow field.

An example of object flow, according to an embodiment, is illustrated in FIG. 6A. Object flow may be used to quantify the motion of the object relative to the sensor's camera, while the marker flow captures the motion of the gel membrane relative to the camera. Object flow may be computed using the same optical flow method as for marker flow, but applied to the original tactile image frames using a window size that captures the spatial neighborhood of each marker. This provides a dense field of flow vectors at locations where an object is moving behind the sensor surface, i.e., object flow, as illustrated in FIG. 6A.

An example of marker flow, according to an embodiment, is illustrated in FIG. 6B. The tracking of markers may allow for measurement of the deformation of the sensor surface when it is in contact with an object. To segment the markers in the tactile imprint, a classic strategy for color based segmentation may be used, based on adaptive thresholding. Detected foreground regions may be filtered by area and a measure of circularity defined by area divided by perimeter squared. This preliminary image processing step may give reliable marker labels. For improved robustness, a segmentation model (e.g., Unet) may be trained on paired sequences of original and label images for pixel-wise binary segmentation of the image. The combination of classic and modern computer vision methods for marker detection provides a number of benefits and/or advantages, including ease of processing of newly sensed data, ease of training to adapt to changes in illumination, and applicability to new visuotactile sensors with different marker patterns. Marker segmentation results provided by a trained U-net on image frames are shown in e.g., FIG. 6B. The displacements of the embedded markers may be captured by applying frame to frame optical flow to binary segmented marker images using an algorithm for measuring optic flows, e.g., Farneback algorithm. This may result in non-zero flow estimates at locations where markers are moving and also provides a local estimate of the direction of marker motion. To estimate the flow of the gel membrane, the flow obtained at the marker location of the area of the sensor may be interpolated, as shown in FIG. 6B.

An example of slip flow, according to an embodiment, is illustrated in FIG. 6C. The slip field may be defined as a difference between the object flow and the marker flow. For example, the difference between object flow and marker flow may be caused by the object moving independently relative to the membrane, suggesting slip. The above computations may be restricted to regions that are estimated to be in contact. An example of the object flow, marker flow, and their difference, a 'slip' flow field, is illustrated in FIGS. 6A, 6B, and 6C. The slip field shows that the object (e.g., a Lego block) is slipping at the bottom right corner. The vectors describe the magnitude and direction of slippage for every region where the object is in contact, providing a richer representation than traditional binary slip detectors.

Figure 7:
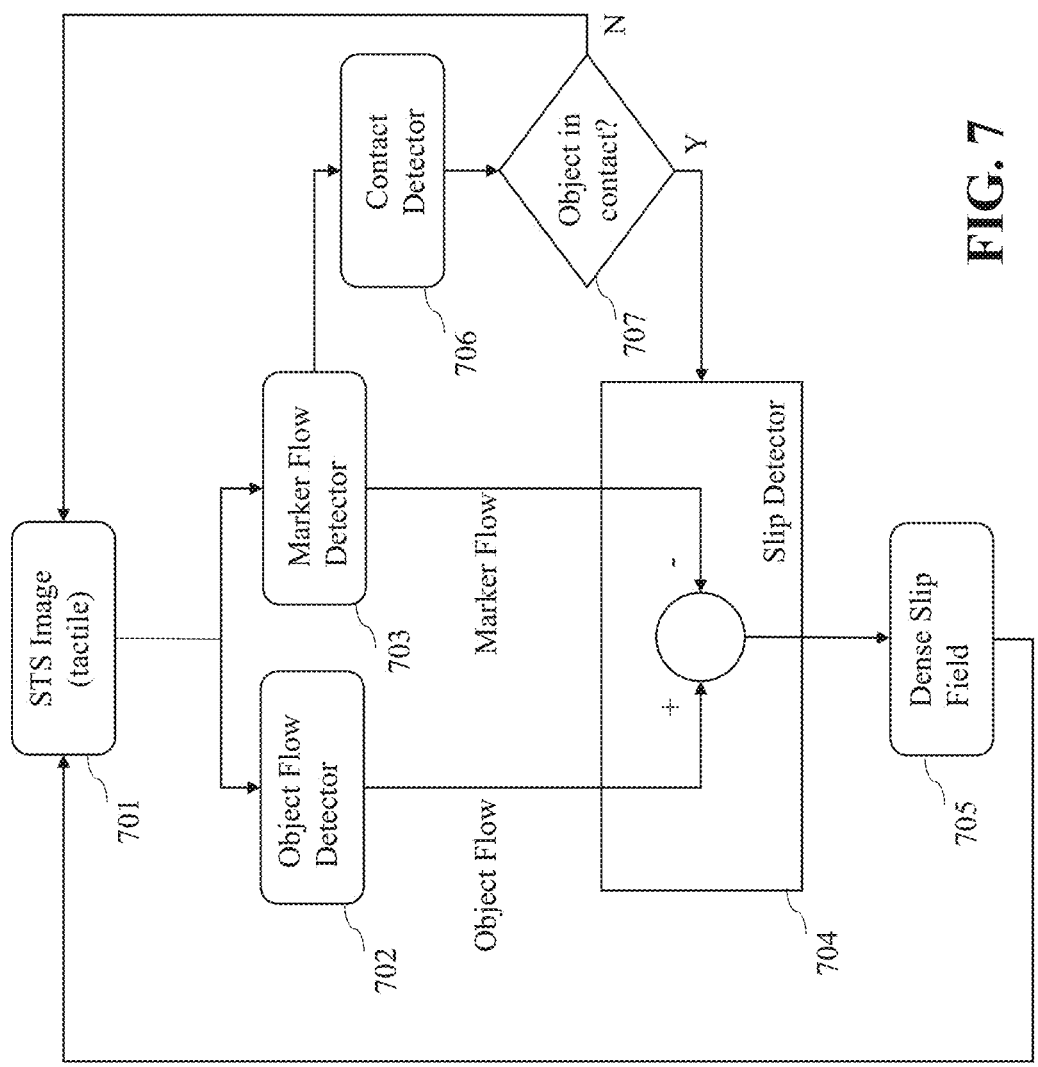
FIG. 7 is a flowchart illustrating a method for detecting slip, according to an embodiment.

FIG. 7 illustrates a flowchart of a method for detecting slip, according to an embodiment. The visuotactile sensor 701 returns a tactile image that is processed by two parallel detectors: object flow detector 702 and marker flow detector 703. The marker flow detector 703, identifying how a membrane deforms, may be used to detect if contact is currently occurring at contact detector 706. At operation 707, if contact is detected, indicating the presence of a grasped object, then slip detector 704, using a slip detection algorithm, subtracts a marker flow from an object flow to return a dense slip field 705, describing how the object moves relative to the sensor.

Figure 8:
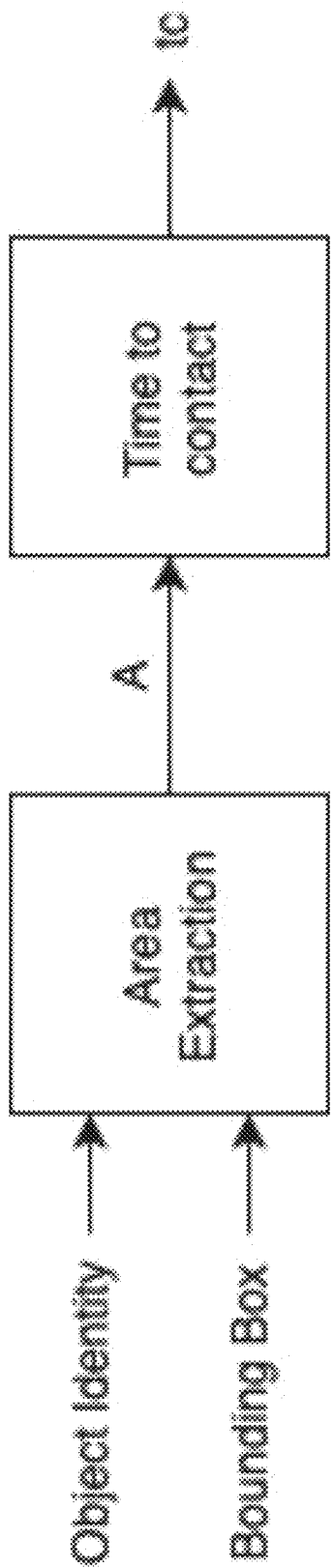
FIG. 8 is a diagram illustrating a method for estimating a time to contact, according to an embodiment.

FIG. 8 is a diagram illustrating a method for estimating a time to contact, according to an embodiment. Based on an identity of an object and an algorithm identifying a bounding box, an area of the bounding box may be extracted. A time to contact (e.g., collision) of the object with the sensor (e.g., tc) may be determined based on the area of the bounding box. The area of the bounding box may be mapped to the time estimate dt. Using the object detection module described in FIG. 2A, the time to contact may be estimated according to FIG. 8 and equation (1) below. The bounding box provides an area, and the change in bounding box area is estimated over a number of frames.

The time to contact, i.e., the estimating time at which the sensor will collide with an object may be estimated based on a number of image-space properties. For example, the time to contact may be estimated under perspective projection and reasonable assumptions. An object may be visualized on a rectangular area of width w and height h with a constant depth z0. Furthermore, the size of the object including the area of the object at contact is known. If the size and area of the object is known, the estimated area At of the target at time t, along with the known area of the target at contact $A_{touch}$, an estimated time to contact may be equal to:

$$t_{contact} = \frac{A_{touch} - A_t}{\frac{dA}{dt}} \quad (1)$$

Figure 9:
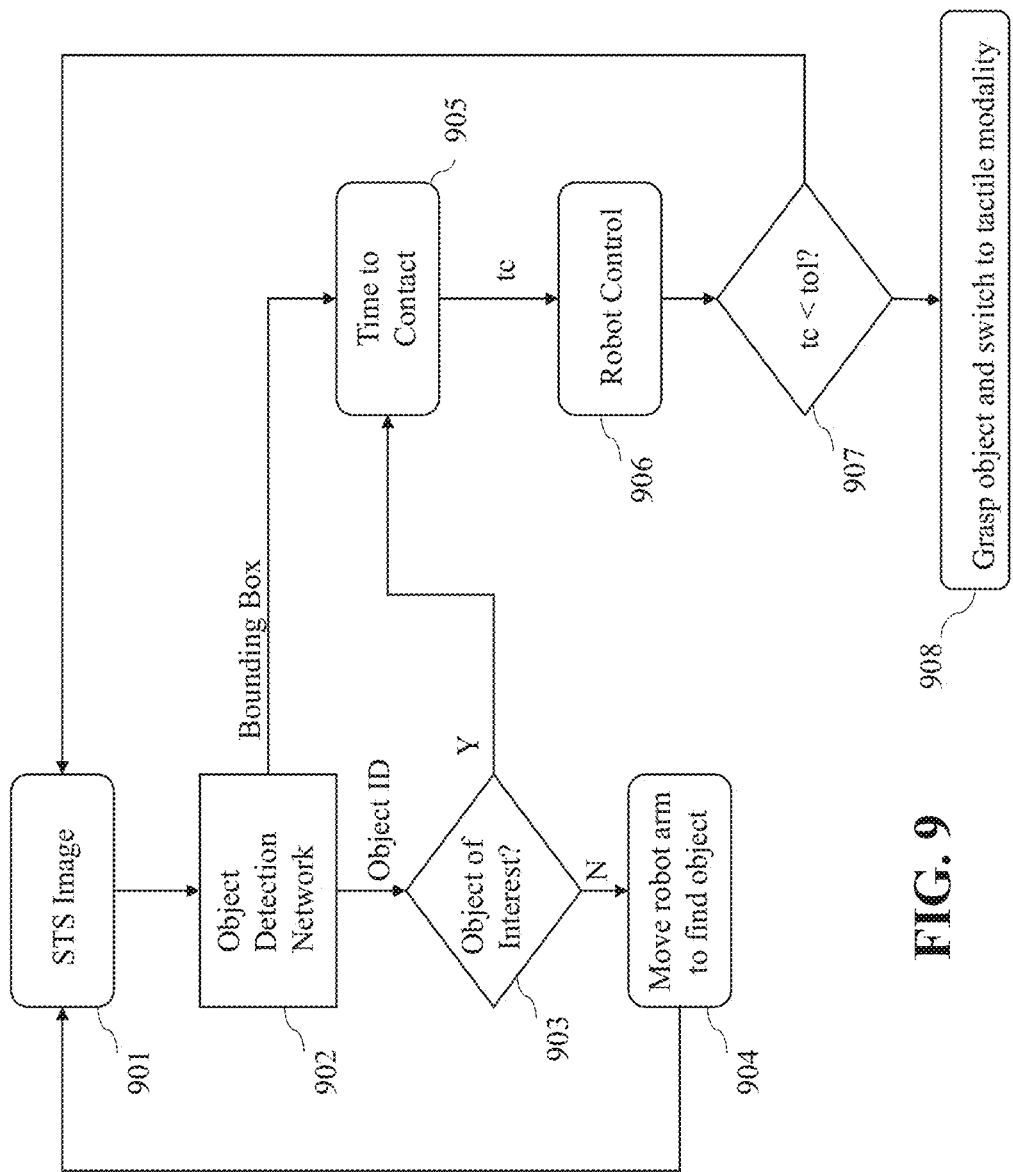
FIG. 9 is a flowchart illustrating a method of determining a time to contacting an object, according to an embodiment.

FIG. 9 is a flowchart illustrating a method of determining a time to contacting an object, according to an embodiment. The visuotactile sensor returns a visual image 901 that is processed by an object detection network 902. While an object of interest is not found (903-N), the robot arm may continue to move (904) until the object of interest is found. Once the object targeted to be manipulated is found (903-Y), a bounding box is used to detect the estimated time to contact at operation 905. This measurement may be used to control the robot speed at operation 906, for example, by moving the robot with a velocity that is proportional to the remaining time to collision. At operation 907, it is determined whether the sensor is within a desired tolerance of a time to contact the object. At operation 908, based on the sensor being within a desired tolerance, the robot grasps the object and modulates the sensor to switch to tactile sensing.

Figure 10:
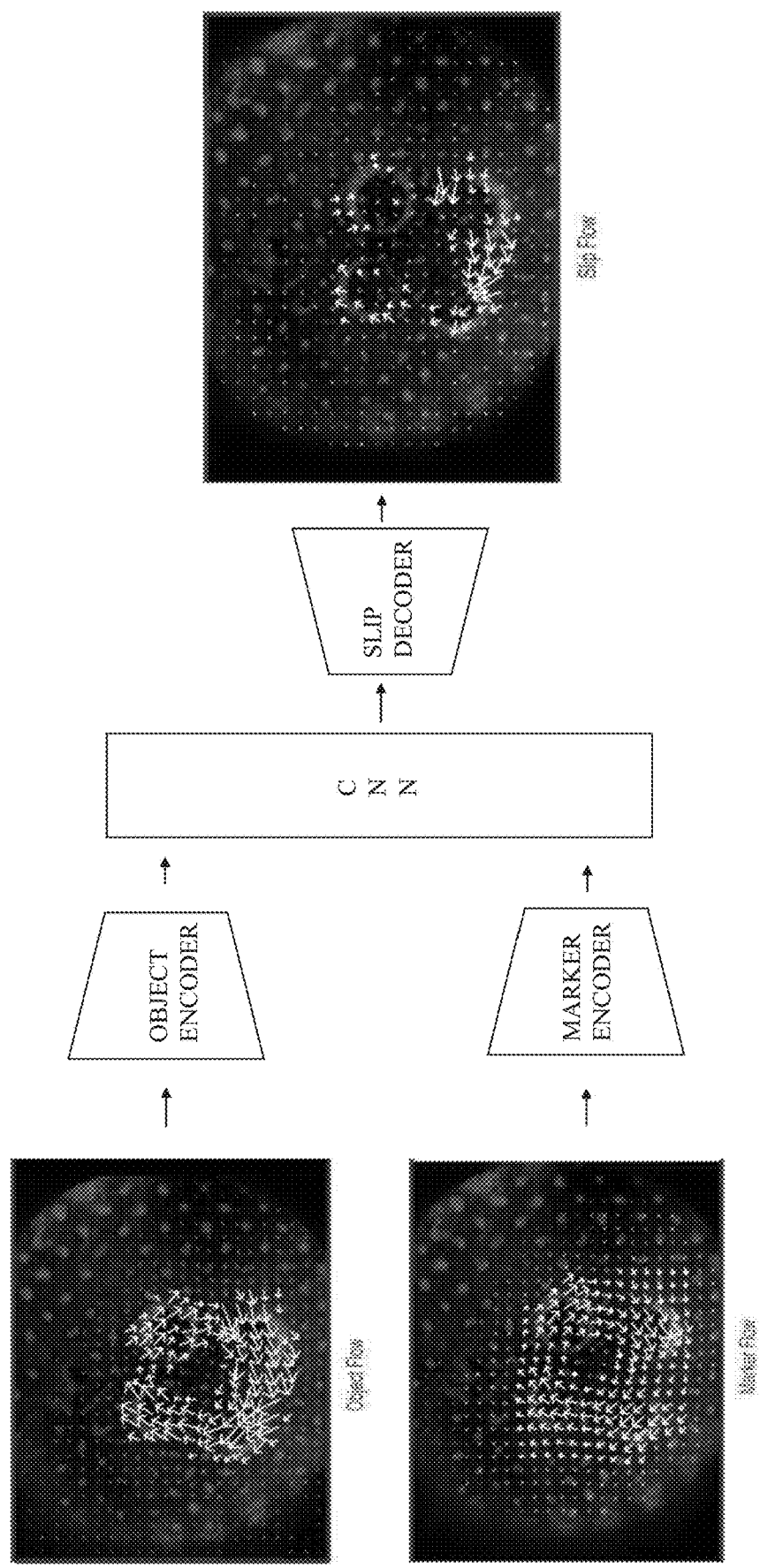
FIG. 10 is a diagram illustrating a learned slip detector, according to an embodiment.

FIG. 10 is a diagram illustrating a learned slip detector, according to an embodiment. As illustrated in FIG. 10, a method includes detecting a dense object slippage field when an object is in contact with the sensor. According to an embodiment, a learning system may be used to combine the object flow and marker flow presented in FIGS. 6A, 6B, and 6C, rather than using a subtraction operator. For example, the object flow may be provided to an object encoder and the marker flow may be provided to a marker encoder. An output of the object encoder and the marker encoder may be provided to a convolutional neural network (CNN) (e.g., Unet). The CNN architecture takes as input the encoded object flow image and the encoded marker flow image, estimates a pixel-wise dense slip field using a slip decoder to generate a slip flow image, as shown in FIG. 10.

As illustrated in FIG. 10, a difference operator may be learned using the CNN to generate a slip flow image. A learned slip detector may have improved identification of difficult-to-track object features on texture-less objects by, for example, focusing on a boundary of the boundaries rather than an entire contact region.

Figure 11:
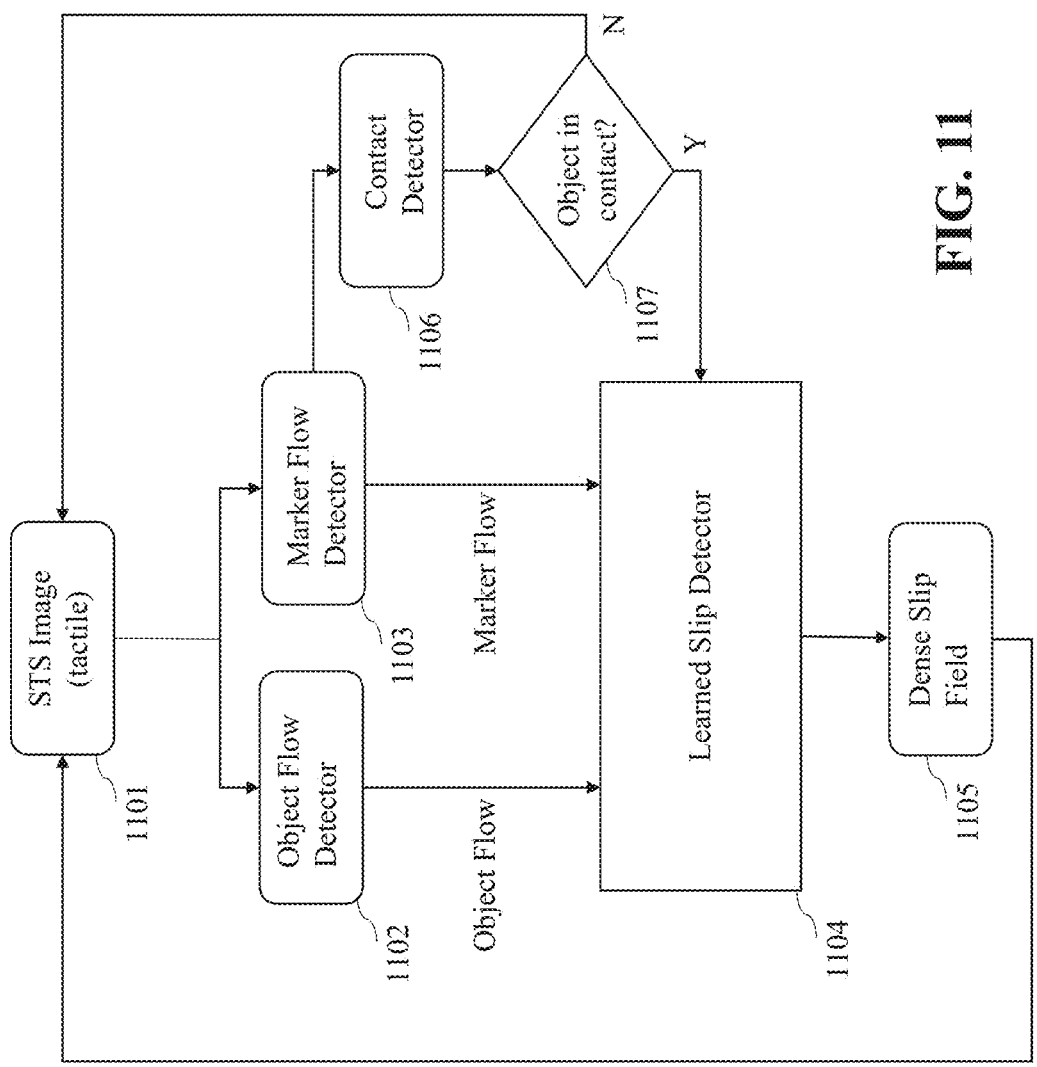
FIG. 11 is a diagram illustrating a method of detecting slip flow using a learned slip flow detector, according to an embodiment

FIG. 11 is a diagram illustrating a method of detecting slip flow using a learned slip flow detector, according to an embodiment. A visuotactile sensor returns a tactile image 1101 that is processed by two parallel detectors: object flow detector 1102 and marker flow detector 1103. The marker flow detector 1103, identifying how the membrane deforms, is used to detect if contact is currently occurring at contact detector 1106. At operation 1107, if contact is detected, indicating the presence of a grasped object, then learned slip detector 1104, using a learned slip detection algorithm, takes as input the object flow and marker flow to return the dense slip field 1105, identifying how the object moves relative to the sensor.

The methods and features described above may be used to provide robots with sensing capabilities that will allow them to grasp objects with more dexterity and increased speed. The number of grasps per hour that a robot can perform may be useful for identifying an efficiency of a grasping system.

Faster Grasp Approach Phase: during an approach phase when a robot moves to grasp the object, the object detection and localization described above allows a robot to maintain a line of sight with the object (i.e., no occlusions) and estimate the distance to contact. This enables grasping systems to approach objects faster by reducing the uncertainty on the location of the object and the time to collision. This may have an impact on accelerating the deployment of robots in factories when robots must compete with the effectiveness of human pickers.

Slip aware trajectory optimization: once an object is grasped by the robot, the robot can exploit Feature #2 of the patent (slip detection) to move the object to its target location as fast as possible while avoiding object slippage. Accuracy and resolution of a slip detection algorithm may allow the robot to reduce the acceleration in the direction of the slip vectors to prevent grasping failures.

There are a number of robotic automation factories that rely on robots to assemble consumer electronic devices, that include manipulating cables and inserting them in their respective locations. The features presented in this patent present opportunities to fully exploit visuotactile measurements to accomplish dexterous robotic tasks that were previously impossible.

Cables may be bundled together and must be disentangled during a grasping phase. As such, it may be useful to recognize an identity and location of a cable to be grasped dynamically, i.e. during the grasp phase. Object detection and localization, according to an embodiment, enables fine grasping capabilities and may open opportunities for robotics and automation in factories operated by human workers.

Once a desired cable is grasped, it should be inserted in the required slot. This insertion task may be challenging for robots to accomplish as they may not visualize a hole during an insertion process and the process is driven by tactile cues. A dense slip detection algorithm, according to an embodiment, provides a robot with valuable feedback on the geometry and location of the hole. This enables new sensing capabilities that may help robots accomplish tasks in a large factory.

Robots may be used to integrate a number of environments such as restaurants or customer service, where they may be expected to handover objects to humans. For example, robot waiters may be in a restaurant and tasked with setting and serving a table while interacting with humans.

Object detection and localization may provide for visually detecting possible robot grasps by integrating information from within the fingertips. A human that hands over an object to a human may move an object in difficult to anticipate ways that may complicate grasp planning. By using object detection according to embodiments of the present disclosure, a relative distance between an object and a robot may be inferred and used to effectively retrieve the object.

High resolution slip detection information may be used by a robot to determine a timing for when a robot should let go of the object as it is handing over objects to a human. For example, as a human secures a stable grasp on an object, the additional constraints on the object may cause object slippage relative to a robot gripper. By detecting a magnitude and direction of such slip vectors, a robot may determine when it is safe to let go of the object.

The above description provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

What is claimed is:

1. A method for identifying and manipulating objects, the method comprising:
obtaining, from an image sensor, image sensor data;
identifying, using the image sensor data, a location of an object;
controlling a robotic element, which includes the image sensor, to move towards the location of the object;
controlling a speed of the robotic element based on a time to contact the object,
based on the time to contact the object being within a desired tolerance, grasping the object and modulating the image sensor to switch to tactile sensing,
determining a slippage based on contact between the image sensor and the object; and
controlling a movement of the robotic element based on the determined slippage,
wherein the determining the slippage comprises determining a marker flow and determining an object flow, and determining a pixel-wise slip vector field as a difference between the object flow and the marker flow,
wherein the identifying the location of the object comprises identifying a bounding box for the object in an image that is represented by the image sensor data,
wherein the time to contact the object is determined based on an area of the bounding box.

2. The method of claim 1, wherein the identifying the bounding box comprises predicting coordinates of the bounding box in the image.

3. The method of claim 1, wherein the identifying the bounding box comprises identifying a centroid of the bounding box and determining a distance between the centroid and a center of the image sensor.

4. The method of claim 1, wherein the determining the slippage comprises measuring a deformation of a surface of the image sensor when the image sensor is in contact with the object.

5. The method of claim 1, wherein the determining the marker flow comprises identifying movement of at least one marker, and wherein determining the object flow comprises determining a motion of the object in relation to the image sensor.

6. The method of claim 1, further comprising combining the marker flow and the object flow using a convolutional neural network architecture.

7. An electronic device for performing image authentication, the electronic device comprising:
  at least memory storing instructions; and
  at least one processor configured to execute the instructions to:
    obtain, from an image sensor, image sensor data;
    identify, using the image sensor data, a location of an object;
    control a robotic element, which includes the image sensor, to move towards the location of the object;
    control a speed of the robotic element based on a time to contact the object;
    based on the time to contact the object being within a desired tolerance, grasp the object and modulate the image sensor to switch to tactile sensing;
    determine a slippage based on contact between the image sensor and the object; and
    control a movement of the robotic element based on the determined slippage,
  wherein the at least one processor is further configured to determine a marker flow and determine an object flow, and determine a pixel-wise slip vector field as a difference between the object flow and the marker flow; and
  identify a bounding box for the object in an image that is represented by the image sensor data,
  wherein the time to contact the object is determined based on an area of the bounding box.

8. The electronic device of claim 7, wherein the at least one processor is further configured to predict coordinates of the bounding box in the image.

9. The electronic device of claim 7, wherein the at least one processor is further configured to identify a centroid of the bounding box and determine a distance between the centroid and a center of the image sensor.

10. The electronic device of claim 7, wherein the at least one processor is further configured to measure a deformation of a surface of the image sensor when the image sensor is in contact with the object.

11. The electronic device of claim 7, wherein the at least one processor is further configured to identify movement of at least one marker, and wherein determining the object flow comprises determining a motion of the object in relation to the image sensor.

12. The electronic device of claim 7, wherein the at least one processor is further configured to combine the marker flow and the object flow using a convolutional neural network architecture.

13. A non-transitory computer readable storage medium that stores instructions to be executed by at least one processor to perform a method for identifying and manipulating objects, the method comprising:
  obtaining, from an image sensor, image sensor data;
  identifying, using the image sensor data, a location of an object;
  controlling a robotic element, which includes the image sensor, to move towards the location of the object;
  controlling a speed of the robotic element based on a time to contact the object;
  based on the time to contact the object being within a desired tolerance, grasping the object and modulating the image sensor to switch to tactile sensing;
  determining a slippage based on contact between the image sensor and the object; and
  controlling a movement of the robotic element based on the determined slippage,
  wherein the determining the slippage comprises determining a marker flow and determining an object flow, and determining a pixel-wise slip vector field as a difference between the object flow and the marker flow,
  wherein the identifying the location of the object comprises identifying a bounding box for the object in an image that is represented by the image sensor data, and
  wherein the time to contact the object is determined based on an area of the bounding box.

14. The non-transitory computer readable storage medium of claim 13, wherein the identifying the bounding box comprises predicting coordinates of the bounding box in the image.

15. The non-transitory computer readable storage medium of claim 13, wherein the identifying the bounding box comprises identifying a centroid of the bounding box and determining a distance between the centroid and a center of the image sensor.

* * * * *